Patented July 9, 1946

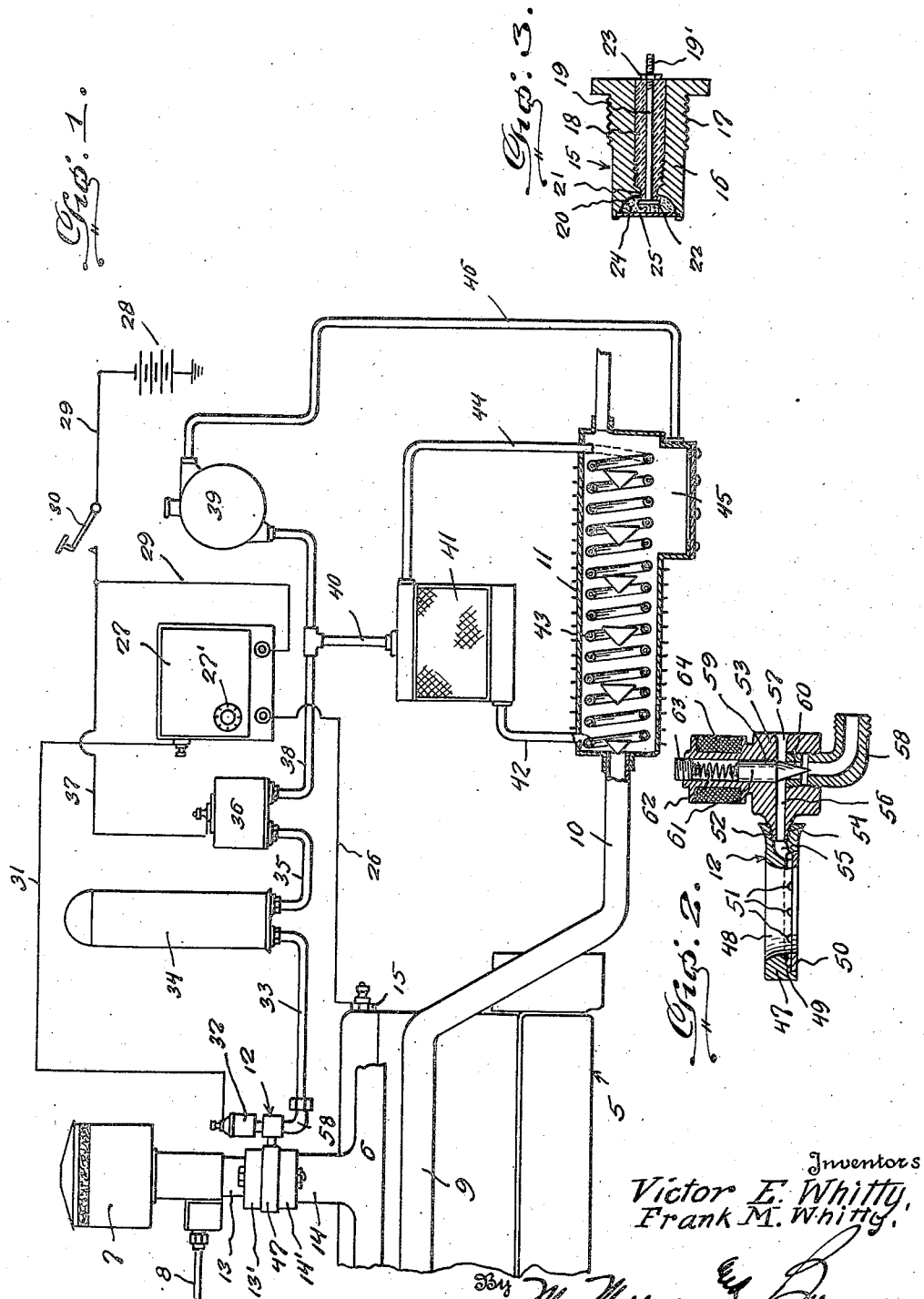

2,403,774

UNITED STATES PATENT OFFICE 2,403,774

CONTROL FOR INTERNAL-COMBUSTION ENGINES

Victor E. Whitty, Oakland, and Frank M. Whitty, Los Angeles, Calif.

Application March 23, 1945, Serial No. 584,368

3 Claims. (Cl. 123—25)

This invention relates to internal combustion engines and more particularly to the characterization and control of the fuel charge for such engines.

It is a known and accepted fact that the introduction of water or water vapor, in correct proportion to the fuel charge, into the combustion chamber of an internal combustion engine along with the fuel charge, makes possible the use of higher compression pressures through the elimination of detonation or "ping" and permits the use of fuel of low octane rating in the attainment of high efficiency equal to that of high octane. It is also known that the efficiency and horse power output of a given engine are raised in direct proportion to the raise in compression pressure and the weight of the fuel charge burned, of course, within certain accepted limits. It is still further known that other benefits result from the use of a correct amount of water or water vapor along with the regular fuel charge, such as for example, the elimination of the formation of hard carbon, production of a cleaner burning fuel mixture, and a longer lasting engine.

The prime object of the present invention is to provide in a practical way a characteristic fuel mixture of the kind above described and an automatic control and utilization of the same in the operation of an internal combustion engine.

Other particular objects and advantages to be attained will hereinafter more fully appear in the following description.

In the accomplishment of the purposes of the invention, there is provided an electronically controlled metering and mixing device to automatically introduce the correct amount of water or water vapor into the combustion chamber of the engine mixed with the fuel charge. A suitable pump and pressure chamber is also utilized to provide an adequate supply of water to the mixing device as needed. There is also included in the operating and controlling system a reservoir or expansion tank, to contain the reserve supply of water, and a suitable condenser and exhaust muffler combination or the like for the recovery of as much as possible of usable water vapor from the exhaust, together with such other adjuncts or parts as will be later described in detail in the following specification:

A practical but non-limiting exemplification of the invention is illustrated in the accompanying drawing, in which:

Figure 1 is a side elevation, more or less schematic in character, illustrating a complete fuel creating and controlling system;

Figure 2 is a sectional view showing details of the mixing assembly; and

Figure 3 is a sectional detail view of the microphone assembly.

Referring now to the drawing in detail, the numeral 5 designates generally the body of an ordinary internal combustion engine. The numeral 6 indicates the usual intake manifold which supplies the fuel charges to the respective power cylinders of the engine, if the same be of a multiple cylinder type, or to the sole cylinder of the engine if it be of the single cylinder type. The regular hydrocarbon fuel mixture is supplied by the carburetor 7 into which leads the usual supply pipe 8 from a source of hydrocarbon supply (not shown).

The exhaust manifold 9 for the products of combustion from the engine is connected by the usual exhaust pipe 10 to a muffler 11, which latter, as will hereinafter be more fully described in detail, constitutes a part of the condenser in accordance with the invention.

A metering valved water or water vapor mixing assembly 12 is provided between the meeting flanged end portions of the pipes 13 and 14 connecting the carburetor to the fuel intake manifold 6. This metering valved assembly, to be more fully described in detail, is controlled electronically by a microphone designated generally by the reference numeral 15. This microphone is preferably of the carbon type and conventional in character except as to having special provision for shielding it for purposes of the present invention. It is mounted on the engine casing and projected into the water circulating chamber of the cylinder head or else some part of the water jacket of the engine as may be most convenient for its installation. In this way its diaphragm is in direct contact with the cooling water in the cylinder head or jacket of the engine so as to transmit sounds received through the conductivity of the water.

The sectional form of the microphone is illustrated in Figure 3. As shown, the same comprises a tubular nipple or bushing 16 having an externally screw threaded portion 17 whereby the device may be secured removably in a correspondingly threaded opening in the engine casing. Fitted in the bore of the member 16 is a core 18 of insulating material having a small bore extending lengthwise therethrough for the reception of the stem portion 19 of an elongated metallic conductor element 19'. The inner end portion of the member 16 is formed with an enlarged cavity or recess 20 which communicates with the main bore of the member 16 through a restricted throat 21. The insulating core 18 fits the bore in the member 16 closely and tightly and it has a reduced inner end portion likewise fitting the throat 21 and projecting into the cavity or recess 20. The conductor element 19' is provided with a disc-like head or collar 22 at its inner end which is drawn and held in close contact with the end of the core 18 by a nut 23 provided on the screw threaded outer end portion of the stem 19 of the conductor. The cavity or recess 20 in the member 16 is filled with a body of powdered carbon 24 into which the head 22 of the conductor 19' is embedded and thereby entirely surrounded, the carbon being retained in the cavity or recess 20 by the microphone diaphragm 25.

The electrical impulse of the microphone 15 is carried from the conductor 19' thereof through a lead 26 (which is an insulated wire enclosed in a flexible metal mesh covering) to a special frequency amplifier 27, which latter is energized from a suitable source of electrical energy, indicated conventionally as a battery 28 in Figure 1. This covering prevents any stray electrical impulses from being imposed upon the lead 26 and thereby carried to the special frequency amplifier 27. The thus avoided stray impulses may be such as produced by the ignition, generator and other electrical apparatus in the vicinity of the microphone 15 or lead 26. A lead 29 from the battery to the amplifier is controlled by a conventional switch 30. The output current from the amplifier 27 is conducted through a lead 31 to an electrical controlling element 32 for the metering valved water distributing element 12. This element 32 will be later described more fully in detail as to its specific structure and its working control of the element 12.

Water is supplied to the metering valve distributing and mixing element 12 through a pipe 33 from a pressure tank 34, which latter is supplied through a pipe 35 from a pump 36 of any desirable and approved type. This pump 36 may be obviously operated as an engine accessory and in any suitable manner, but, as indicated, it is electrically operated and receives its energy through a lead 37 from the battery 28.

In operation, the pump 36 draws water into a pipe 38 from a supply reservoir or expansion tank 39. The tank or supply reservoir 39 also supplies water to a bypass 40 leading from the pipe 38 to a radiator 41, which latter is connected by an output pipe 42 to a condensing coil 43 located within the exhaust muffler casing 11. A return pipe 44 from the coil 43 leads into the upper part of the radiator 41. By this provision of connected radiator and the coil 43 located within the muffler, cooling water is circulated through the coil, thus causing condensation of the products of combustion exhausted from the engine and the water resulting from this condensation settles into a sump 45 provided at the bottom and near the outer end of the muffler. The tank 39 being closed and substantially sealed, ample vacuum is created in the upper portion of the tank as the pump 36 draws water from the lower portion thereof, and thus the water accumulating in the sump 45 of the muffler 11 is drawn out of the sump through a pipe 46 and delivered into the upper portion of said tank 39.

The metering valved water distributing and mixing device will now be described in detail. As shown more clearly in Figure 2, this device comprises a ring member 47, which, as shown in Figure 1, is interposed and secured between the flanged end portions 13' and 14' of the fuel supply pipes 13 and 14, respectively, supplying the fuel mixture to the manifold 6. The opening 48 of this ring member 47 is flared upwardly so as to have the effect of a venturi as the fuel mixture from the carbureter 7 flows downwardly through said opening 48. Surrounding the opening 48 in the member 47 is an annular passageway 49 provided by forming an annular groove in the bottom portion of the member 47, which groove is of semicircular cross section and closed by an annular plate 50 fitted in a counter recessed portion of the member 47 and screwed, bolted or otherwise secured in place. At intervals throughout the extent of the annular passageway 49 radial ports 51 are provided for establishing jet communication between the passageway 49 and opening 48 of the member 47. The member 47 is provided with a connecting boss 52 for the attachment of a metering valve member 53. The valve member 53 has a nipple extension 54 screwed or otherwise supportingly fitted into the boss 52 of the member 47. The boss 52 has an internal passageway 55 communicating with the annular passageway 49 of the member 47, and the valve member 53 has a transverse passageway 56 communicating through the nipple 54 with the passageway 55 in the member 47, said passageway 56 extending to the outer side of the valve member 53 and being slightly flared, as at 57, so as to readily take in outside air.

An elbow coupling 58 from the water supply pipe 33 leading from the tank 34, is attached to the valve member 53 and communicates with the passageway 56 of said member 53 perpendicularly thereof. A vertical passageway 59 in the valve member 53 is aligned axially with a valve seat 60 at the inner end of the elbow coupling 58. Slidable in the bore 59 is a valve element 61 having a tapered end portion pressed normally into engagement with the seat 60 by a spring 62 which is interposed and placed under compression between the valve member 61 and a screw threaded plug or cap 63 which is inserted in the outer end portion of the bore 59 of the valve member. The threaded fitting of the plug or cap 63 is for the purpose of adjustment of the same to vary the tension of the spring 62 for the working regulation of the valve member 61.

The upper portion of the valve member 53 surrounding the bore 59 is reduced in diameter to provide a stem or shank portion about which is wound a solenoid coil 64. This solenoid coil 64 is in circuit with and under the control of the amplifier 27 through the aforesaid lead 31.

Normally, the valve member 61 is in closing relation to the valve seat 60 in the valve member 53 but is withdrawn from the seat 60 by energization of the solenoid coil 64 through and under the control of the amplifier 27. The degree of opening movement of the valve member 61 is regulated and varied at will, by the aforesaid adjustment of the cap or plug 63 and consequent variations in the resistance and reactive effect of the spring 62. Thus, as the metering valve 61 is raised from its seat it allows a measured amount of water to pass into the annular air passageway 49, whence it is discharged through the radial ports 51 and is thus sprayed into the mixture of vaporized hydrocarbon fuel and air coming from the carbureter 7 and while the same is passing through the Venturi opening 48. In this connection it is noted that the water from the elbow coupling 58 in passing into and through the passageway 56 of the metering valve 53 draws in therewith a metered amount of air through the air intake 57 and this air and water is commingled thoroughly before it is discharged from the port openings 51 from the annular passageway 49 and distributed in the fuel mixture coming from the carbureter 7.

From the foregoing it is evident that, utilizing the conductivity of water, the detonation or "ping" occurring in the engine cylinder or cylinders is transmitted to the microphone 15 and thence electronically to the amplifier 27, which latter through its special frequency characteristics in which its greatest gain is at frequencies near, for example, 9000 cycles per second, which is the usual frequency of the detonation or "ping," the solenoid 64 is energized so as to actuate the metering valve right upon the threshold or immediate occurrence of detonation or "ping." The conductor 19' of the microphone 15, due to its encasement in the insulating core 18 within the plug 16 and the insertion of the plug within the body of water in the circulatory cooling system with only the diaphragm 25 in direct contact with the water, an effective electrical shielding of the conductor is had whereby the sound of detonation or "ping" in the engine cylinders is conducted through the electrically shielded lead 26 to the amplifier 27 without interference of any other sound such as the noise of ignition and other causes in and about the engine.

By adjusting the tension of the spring 62 which acts upon the metering valve element 61, said valve element may be regulated, at will, to admit to the mixing device an accurately proportioned amount of water commensurate with the requirements in the use of different grades of gasoline from the very low octane type to that of high grade ethyl gasoline. In this connection, also, it is noted that the amplifier 27 which has special frequency characteristics as hereinabove described, is provided with a volume control 27' indicated conventionally in Figure 1, for regulating and adapting the amplifier for ideal operation with the metering valved mixing device 12 according to the grade of hydrocarbon fuel used and the compression ratio for which the engine is designed.

In the practical adaptation of the invention an engine designed for a compression ratio calling for the very best grade of ethyl gasoline operates smoothly with the poorest grade of low octane gasoline, it being only necessary to adjust the metering valved mixing device 12 and set the control 27' of the amplifier 27. In addition to the possibility of keeping the engine operating steadily right on the verge of detonation and thereby obtaining maximum efficiency under all operating conditions, there is a further advantage in the system of the present invention in that waste gases and water vapor of the engine exhaust are condensed in the exhaust muffler 11, whence the water of condensation is returned through the lead 46 to the supply tank 39.

The illustration in the drawing is but one exemplification of a practical adaptation of the invention which admits of considerable modification within the spirit and scope of the appended claims. The invention, therefore, is not limited to the specific construction and arrangement shown.

Having thus described the invention, what is claimed is:

1. Means for electronically controlling detonation in internal combustion engines, comprising in coordinated combination, a microphone inserted in the water of the cooling system of the engine and shielded against transmission of sounds other than that conducted by the water directly to the sound transmission element of the microphone, a variable gain amplifier having a shielded electrical conductor operating connection with said microphone, a water supply and mixing device interposed in the regular fuel mixture supply duct to the engine, means under pressure for supplying water to the water supply and mixing device, and an electrically operated metering valve controlling the supply of water to said water supply and mixing device, said metering valve being under the control of said amplifier.

2. Means for electronically controlling the detonation in internal combustion engines, comprising the coordinated combination of a microphone inserted in the water of the cooling system of the engine, said microphone being shielded against transmission of sound other than that transmitted directly to it through the surrounding water, an amplifier of fixed frequency response and having means for varying the input sensitivity thereof, said amplifier having a shielded electrical impulse conductor connection with the said microphone, a water supply and mixing device comprising a ring member interposed in the conduit supplying the regular fuel mixture to the engine, the opening through said ring member constituting a Venturi opening, said ring member having an annular chamber surrounding the Venturi opening with radial ports establishing jet communication between the annular passageway of the ring member and said Venturi opening, an electrically operated metering valved supply of water communicably attached to said ring member of the mixing device and having an air intake whereby to supply a measured quantity of water and air to the annular chamber of said ring member, said electrically operated metering valve device being controlled by said amplifier, a pressure tank supplying the water to said metering valve device, a pump for supplying water to the pressure tank, a reserve supply tank from which water is taken by the pump, and means for condensing the exhaust gases and water vapors from the engine and returning the water of condensation to said reserve supply tank.

3. In an electronically controlled system for the control of detonation in internal combustion engines, and including means for automatically supplying a measured quantity of water to the regular fuel mixture supplied to the engine, a solenoid actuated metering valve controlling the supply of water, said valve having a transverse passageway of restricted proportions and provided with an air intake port, said passageway being intersected by the water supply inlet of the valve, a spring pressed metering pin normally closing the transverse passageway of the valve and preventing passage of water and air therethrough, means for varying the effect of spring pressure on said metering pin, a solenoid for retracting said metering pin against the spring pressure thereon, a variable gain amplifier controlling the energization of the solenoid of said metering valve, said amplifier having a volume control for varying the gain thereof, and a microphone inserted in the water of the cooling system of the engine and having a sound-conductive connection with the amplifier for amplification by the latter, said microphone being shielded against sounds other than such that are transmitted directly through the water in the engine cooling system to the sound receiver of the microphone and the connection between the microphone and the amplifier being also shielded against electrical interference to sound transmitted to the microphone through the water in the cooling system of the engine.

VICTOR E. WHITTY.
FRANK M. WHITTY.